(12) United States Patent
Larson et al.

(10) Patent No.: US 7,472,609 B1
(45) Date of Patent: Jan. 6, 2009

(54) FLUID METER

(76) Inventors: Robert E. Larson, 20617 NE. 68th St., Vancouver, WA (US) 98682; Patricia A. Larson, 20617 NE. 68th St., Vancouver, WA (US) 98682

( * ) Notice: Subject to any disclaimer, the term of this patent is extended or adjusted under 35 U.S.C. 154(b) by 0 days.

(21) Appl. No.: 11/781,298

(22) Filed: Jul. 23, 2007

(51) Int. Cl.
*G01F 1/07* (2006.01)
(52) U.S. Cl. .................................... 73/861.88
(58) Field of Classification Search ............ 73/275, 73/861.78, 861.88, 861.87
See application file for complete search history.

(56) References Cited

U.S. PATENT DOCUMENTS 4,461,174 A * 7/1984 Han ........................... 73/275
4,700,579 A * 10/1987 Hall ........................ 73/861.78

* cited by examiner

*Primary Examiner*—Jewel Thompson

(57) ABSTRACT

A fluid meter. An illustrative embodiment of the fluid meter includes a meter housing having a housing interior, a rotatable paddle provided in the meter housing and a counter coupled to the paddle.

5 Claims, 3 Drawing Sheets

FLUID METER

FIELD

The present invention relates to fluid meters which measure the volume of a fluid flowing through a conduit. More particularly, the present invention relates to a fluid meter which can be connected between a pair of conduits or between a faucet and a conduit such as a garden hose to measure the volume of water or other flowing fluid.

BACKGROUND

Under some circumstances such as watering of a garden or lawn, it is desirable to quantify the volume of water which is used to water the garden or lawn. Typically, a garden hose or the like is connected to a faucet and water flows from the faucet, through the garden hose and is ejected from a sprinkler or the like. The quantity of water which is used to water the garden or lawn is typically estimated rather than quantified.

The present invention is generally directed to a fluid meter. An illustrative embodiment of the fluid meter includes a meter housing having a housing interior, a rotatable paddle provided in the meter housing and a counter coupled to the paddle.

BRIEF DESCRIPTION OF THE DRAWINGS

The invention will now be described, by way of example, with reference to the accompanying drawings, in which.

DETAILED DESCRIPTION

Figure 4:
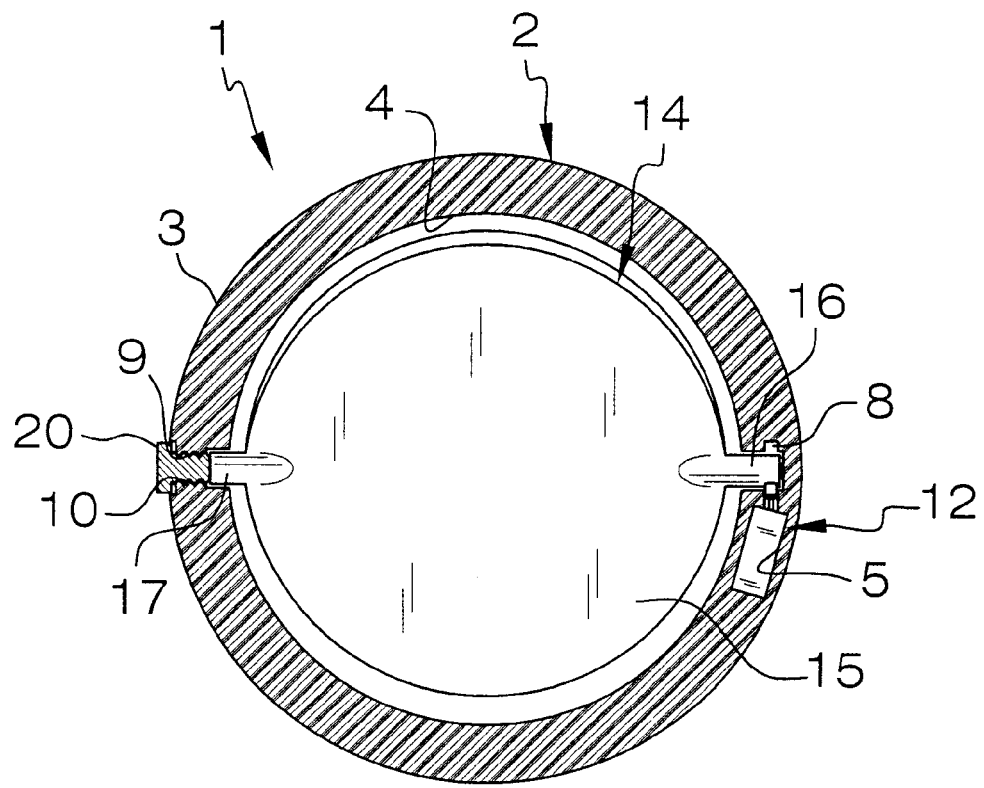
FIG. 4 is a cross-sectional view, taken along section lines 4-4 in FIG. 3, of an illustrative embodiment of the fluid meter.
Figure 5:
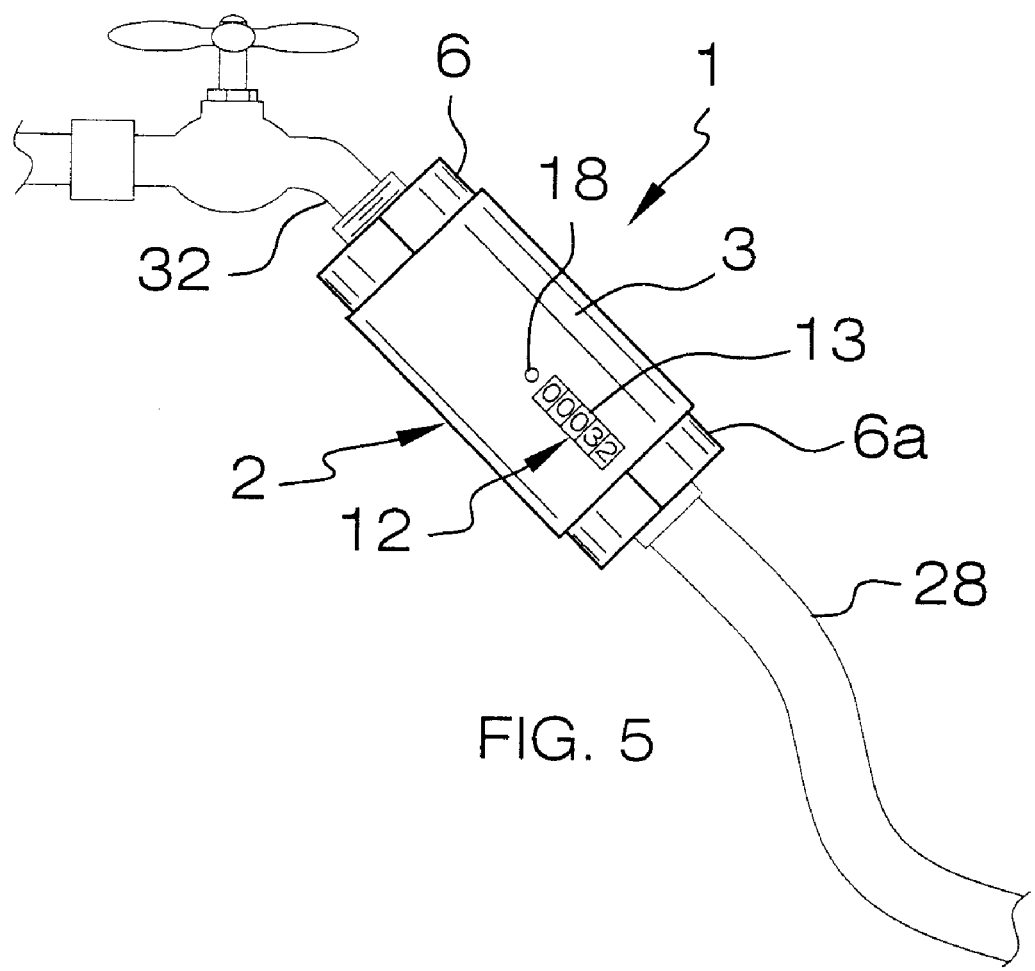
FIG. 5 is a side view of an illustrative embodiment of the fluid meter, with a faucet connected to an inlet end and an outlet conduit connected to an outlet end of the fluid meter.

Referring to the drawings, an illustrative embodiment of the fluid meter is generally indicated by reference numeral 1. The fluid meter 1 includes a meter housing 2 typically having a generally elongated, cylindrical meter housing wall 3. As shown in FIG. 4, the meter housing wall 3 defines a housing interior 4. An inlet housing coupling 6 and an outlet housing coupling 6a are provided at respective ends of the meter housing 2. As housing coupling 6a) each typically has multiple interior housing coupling threads 7.

Figure 3:
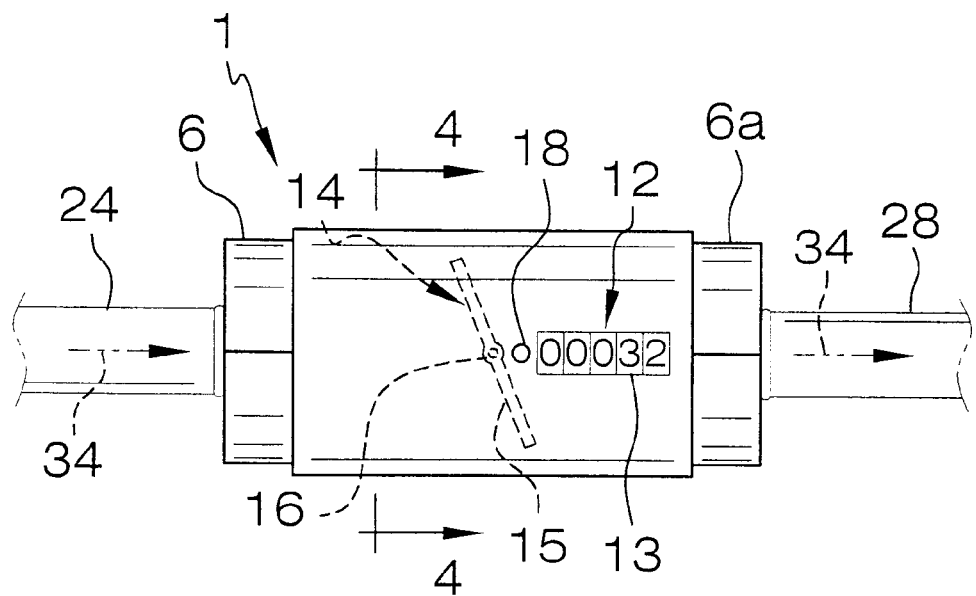
FIG. 3 is a side view of an illustrative embodiment of the fluid meter, with an inlet conduit (partially in section) and an outlet conduit (partially in section) connected to the fluid meter, more particularly illustrating a rotatable paddle provided in the meter housing of the fluid meter.

As shown in FIGS. 3 and 4, a paddle 14 is rotatably mounted in the housing interior 4 of the meter housing 2, with the axis of rotation of the paddle 14 disposed in generally perpendicular relationship with respect to the direction of fluid flow 34 (FIG. 3) through the housing interior 4. The paddle 14 may be rotatably mounted in the housing interior 4 using any suitable technique which is known by those skilled in the art. In some embodiments, a pin cavity 8 and a pin cavity 9 are provided in the interior surface of the meter housing wall 3, in generally diametrically-opposed relationship with respect to each other. An interiorly-threaded screw opening 10 extends through the meter housing wall 3 and communicates with the pin cavity 9. The paddle 14 includes a generally planar, circular paddle panel 15. A paddle pin 16 extends from the paddle panel 15 and is seated in the pin cavity 8. A paddle pin 17 extends from the paddle panel 15, in generally diametrically-opposed relationship with respect to the paddle pin 16, and is seated in the pin cavity 9. A screw 20 is threaded through the screw 14 is capable of rotating in the housing interior 4 responsive to flow of fluid (not shown) through the housing interior 4.

Figure 1:
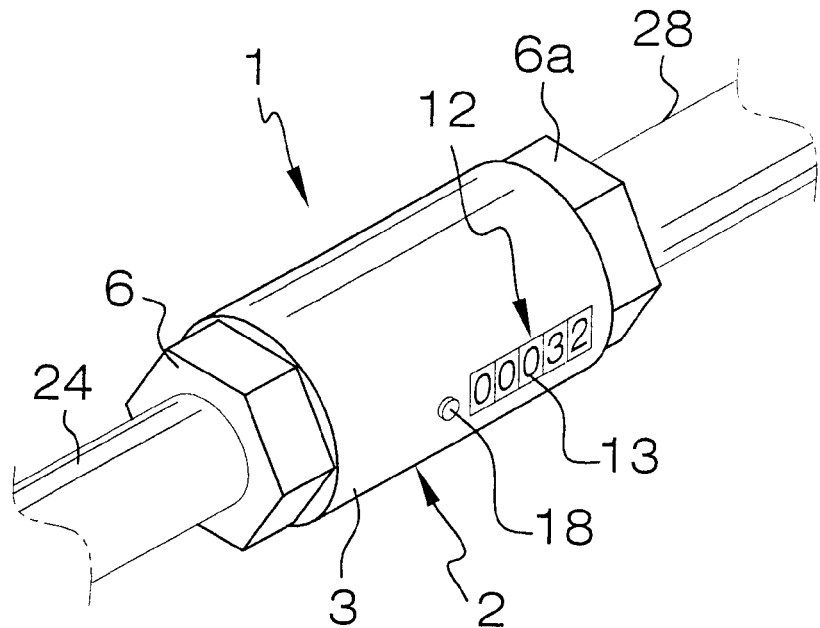
FIG. 1 is a perspective view of an illustrative embodiment of the fluid meter, with an inlet conduit (partially in section) and an outlet conduit (partially in section) connected to the fluid meter.
Figure 2:
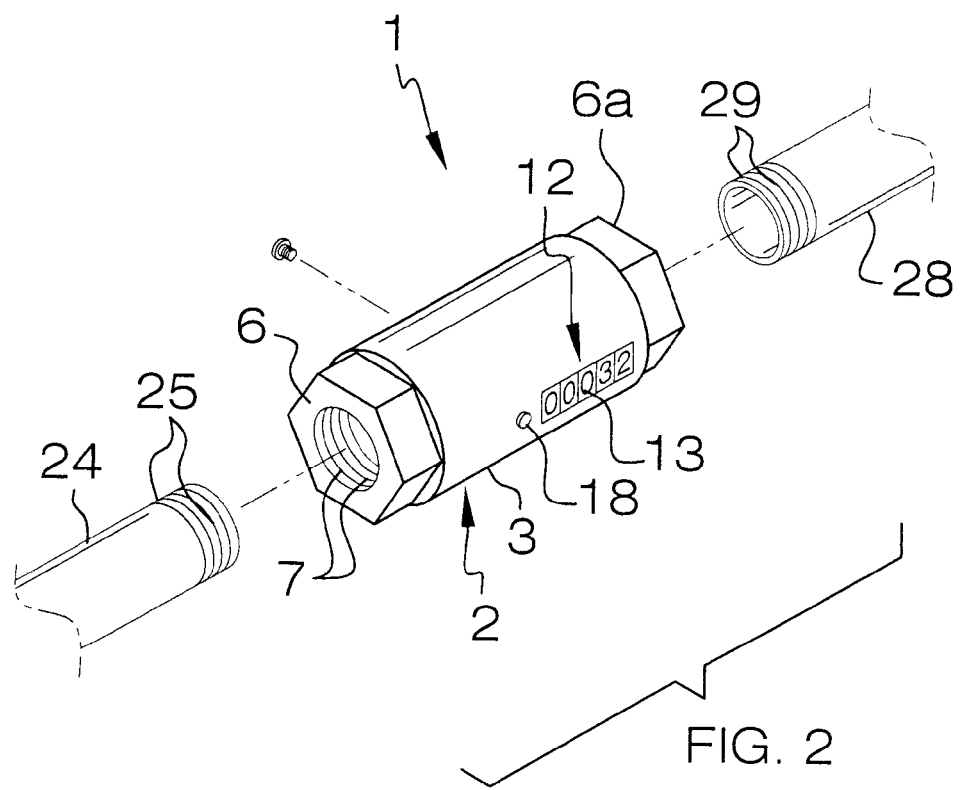
FIG. 2 is a perspective view of an illustrative embodiment of the fluid meter, more particularly illustrating an exemplary technique for connecting an inlet conduit (partially in section) and an outlet conduit (partially in section) to the fluid meter.

As further shown in FIG. 4, a counter cavity 5 is provided in the meter housing wall 3 of the meter housing 2. The counter cavity 5 communicates with the pin cavity 8. A counter 12, which may be a mechanical counter, for example and has a display 13, is provided in the counter cavity 5. The display 13 of the counter 12 is visible on the exterior surface of the meter housing 2. The counter 12 is coupled to the paddle pin 16 of the paddle 14 in such a manner that the counter 12 counts and the display 13 of the counter 12 numerically registers each complete rotation of the paddle 14 in the housing interior 4. The paddle 14 is calibrated in such a manner that each complete rotation of the paddle 14 in the housing interior 4 corresponds to passage of a particular volume of fluid beyond the paddle 14 as it flows through the housing interior 4 from the inlet housing coupling 6 to the outlet housing coupling 6a. As shown in FIGS. 1-3, the counter 12 typically has a reset button 18 to facilitate selective resetting of the display 13 upon depression.

As shown in FIGS. 1 and 2, in typical use an inlet conduit 24 typically having inlet conduit threads 25 (FIG. 2) is connected to the inlet housing coupling 6. An outlet conduit 28 typically having outlet conduit threads 29 is connected to the outlet housing coupling 6a. The inlet conduit 24 is typically connected to a faucet (not shown) and a sprinkler (not shown) or the like may be connected to a discharge end (not shown) of the outlet conduit 28. Each of the inlet conduit 24 and the outlet conduit 28 may be a garden hose or any other type of conduit which conveys a fluid, the volume of which is to be measured using the fluid meter 1. As a fluid flows in the fluid flow direction 34 (FIG. 3) from the inlet conduit 24 and through the housing interior 4 (FIG. 4) of the meter housing 2 and the outlet conduit 28, respectively, the fluid rotates the paddle 14 in the housing interior 4. The display 13 of the counter 12 registers each rotation of the paddle 14 in the housing interior 4, and therefore, numerically indicates the volume of fluid which flows past the paddle 14 and is discharged from the outlet conduit 28. The number which is indicated on the display 13 of the counter 12 may be reset, as desired, by depression of the reset button 18. In an alternative directly to the inlet housing coupling 6 and the outlet conduit is connected to the outlet housing coupling 6a.

While the preferred embodiments of the invention have been described above, it will be recognized and understood that various modifications can be made in the invention and the appended claims are intended to cover all such modifications which may fall within the spirit and scope of the invention.

What is claimed is:

1. A fluid meter, comprising:
a meter housing including a generally elongated, cylindrical meter housing wall having a housing interior;
wherein said housing interior defines a direction of fluid flow through said meter housing;
a rotatable paddle provided in said meter housing and having an axis of rotation generally perpendicular with respect to said direction of fluid flow; said paddle comprises a generally planar, circular paddle panel and a pair of paddle pins extending from said paddle panel and carried by said meter housing wall of said meter housing;
a counter cavity provided in said meter housing wall; and
a counter provided in said counter cavity and coupled to said paddle.

2. The fluid meter of claim 1 further comprising an inlet housing coupling and an outlet housing coupling provided on said meter housing.

3. The fluid meter of claim 1 further comprising a display provided on said counter.

4. The fluid meter of claim 1 further comprising a pair of pin cavities provided in said meter housing wall and wherein said pair of paddle pins is seated in said pair of pin cavities, respectively.

5. The fluid meter of claim 4 further comprising a screw opening communicating with one of said pair of, pin cavities and a screw extending through said screw opening and into one of said pair of paddle pins.

* * * * *